US009346675B2

(12) United States Patent
Bhattacharjee et al.

(10) Patent No.: US 9,346,675 B2
(45) Date of Patent: May 24, 2016

(54) SET-UP FOR PRODUCTION OF HYDROGEN GAS BY THERMO-CHEMICAL DECOMPOSITION OF WATER USING STEEL PLANT SLAG AND WASTE MATERIALS

(75) Inventors: Debashish Bhattacharjee, Jamshedpur (IN); Tridibesh Mukharjee, Jamshedpur (IN); Vilas Tathavadkar, Jamshedpur (IN)

(73) Assignee: Tata Steel Limited, Jamshedpur (IN)

( * ) Notice: Subject to any disclaimer, the term of this patent is extended or adjusted under 35 U.S.C. 154(b) by 0 days.

(21) Appl. No.: 13/415,894

(22) Filed: Mar. 9, 2012

(65) Prior Publication Data

US 2012/0171080 A1 Jul. 5, 2012

Related U.S. Application Data

(62) Division of application No. 12/851,060, filed on Aug. 5, 2010, which is a division of application No. 11/922,955, filed as application No. PCT/IN2006/000198 on Jun. 13, 2006.

(30) Foreign Application Priority Data

Apr. 28, 2006 (IN) ................................ 387/KOL/06

(51) Int. Cl.

*B01J 19/00* (2006.01)
*C01B 3/04* (2006.01)
*C01B 3/06* (2006.01)
*C10J 3/04* (2006.01)
*C10J 3/57* (2006.01)

(52) U.S. Cl.

CPC ................. *C01B 3/042* (2013.01); *C01B 3/061* (2013.01); *C10J 3/04* (2013.01); *C10J 3/57* (2013.01); *C10J 2300/1615* (2013.01); *Y02E 60/364* (2013.01); *Y02P 20/129* (2015.11)

(58) Field of Classification Search

None

See application file for complete search history.

(56) References Cited

U.S. PATENT DOCUMENTS

| | | | | |
|---|---|---|---|---|
| 2,908,737 | A | 10/1959 | Dominicis | |
| 3,083,957 | A | 4/1963 | Langer et al. | |
| 3,205,810 | A * | 9/1965 | Rosenak | 454/64 |
| 3,421,869 | A | 1/1969 | Benson | |
| 3,460,934 | A * | 8/1969 | Kelmar | 75/466 |
| 3,615,298 | A | 10/1971 | Benson | |
| 3,709,997 | A * | 1/1973 | Medovar et al. | 373/53 |
| 3,761,243 | A * | 9/1973 | Kuntz et al. | 65/19 |
| 3,787,193 | A | 1/1974 | Seglin et al. | |

(Continued)

FOREIGN PATENT DOCUMENTS

| | | | |
|---|---|---|---|
| JP | 55-120696 | A | 9/1980 |
| JP | 56-088494 | A | 7/1981 |

(Continued)

OTHER PUBLICATIONS

JP 61083653A Derwent English Abstract, Apr. 28, 1986.*

(Continued)

*Primary Examiner* — Colin W Slifka

(74) *Attorney, Agent, or Firm* — The Webb Law Firm

(57) ABSTRACT

A system for the production of hydrogen from water in the presence of slag, comprising a graphite crucible containing molten slag; a reaction hood disposed over said crucible; a water line for spraying water on the molten slag in the crucible; and a steel tube for collecting and transferring the produced hydrogen gas from said hood into a condenser tank.

8 Claims, 5 Drawing Sheets

(56) References Cited

U.S. PATENT DOCUMENTS

| | | | | |
|---|---|---|---|---|
| 3,979,551 | A | | 9/1976 | Overmyer et al. |
| 4,120,663 | A | | 10/1978 | Fally |
| 4,222,768 | A | | 9/1980 | Suyama |
| 4,389,246 | A | | 6/1983 | Okamura et al. |
| 4,696,680 | A | * | 9/1987 | Ghate et al. ..................... 95/103 |
| 4,720,261 | A | | 1/1988 | Fishwick et al. |
| 5,004,495 | A | | 4/1991 | Labate |
| 5,066,476 | A | | 11/1991 | Wetzel et al. |
| 5,211,744 | A | | 5/1993 | Areaux et al. |
| 6,196,479 | B1 | | 3/2001 | Edlinger |
| 6,685,754 | B2 | | 2/2004 | Kindig et al. |
| 2002/0098394 | A1 | | 7/2002 | Keefer et al. |
| 2003/0056438 | A1 | | 3/2003 | Garnier et al. |
| 2003/0089481 | A1 | | 5/2003 | Moore et al. |
| 2007/0107466 | A1 | | 5/2007 | Vuletic |
| 2010/0111826 | A1 | | 5/2010 | Bhattacharjee et al. |

FOREIGN PATENT DOCUMENTS

| | | | | |
|---|---|---|---|---|
| JP | 61083653 | A | * | 4/1986 |
| JP | 63-103016 | U | | 5/1988 |
| JP | 2006-036804 | A | | 2/2006 |
| WO | 04000723 | A1 | | 12/2003 |
| WO | 2005031008 | A1 | | 4/2005 |

OTHER PUBLICATIONS

JP 61083653 A English Translation, 1986.*

* cited by examiner

SET-UP FOR PRODUCTION OF HYDROGEN GAS BY THERMO-CHEMICAL DECOMPOSITION OF WATER USING STEEL PLANT SLAG AND WASTE MATERIALS

CROSS REFERENCE TO RELATED APPLICATIONS

This application is a divisional application of co-pending divisional U.S. patent application Ser. No. 12/851,060, filed on Aug. 5, 2010, which is a divisional application of co-pending U.S. patent application Ser. No. 11/922,955, filed on Dec. 27, 2007, which is the United States national stage filing under 35 U.S.C. §371 of International Application No. PCT/IN2006/000198, filed on Jun. 13, 2006, all of which are incorporated by reference herein in their entirety.

BACKGROUND OF THE INVENTION

1. Field of Invention

This invention relates to a novel method of generating hydrogen gas from water.

2. Description of Related Art

Hydrogen is emerging as the favorite alternative to fossil fuels. Presently, hydrogen is primarily used as a feedstock, intermediate chemical, or, on a much smaller scale, a specialty chemical. Only a small portion of the hydrogen produced today is used as an energy carrier, mostly by the Aerospace industries. Automotive industries are developing new models that run on either hydrogen based internal combustion engines (ICEs), or gasoline—fuel cell cars. However, most of the commercial hydrogen production processes are not considered as renewable as these technologies merely shift the source of pollution from a distributed one (like cars, households for example) to a more concentrated source like hydrogen producing plants or thermal power plants. The United States hydrogen industry alone currently produces nine million tons of hydrogen per year for use in chemical production, petroleum refining, metals treating, and electrical applications.

The technologies for the utilization of hydrogen as a fuel are at a more advanced stage today than the technologies for the efficient production of hydrogen from renewable resources like solar energy, wind, tidal energy or geo-thermal energy. There is an immediate need to develop better, more efficient and inexpensive technology for the production of hydrogen from renewable resources and bridge this gap between the production and consumption technology of hydrogen and attain a synergy between the two segments. The National Hydrogen Energy Road map of Government of India has also given prominence on development of advanced production techniques and application of technologies based on hydrogen fuel.

The electrolytic process is used worldwide for production of hydrogen gas. Currently, this method is used to produce high purity hydrogen. The cost of hydrogen produced using this method is significantly higher and, hence, it is used only in specialty applications like semiconductor manufacture. But this method can facilitate more distributed hydrogen generation using electricity made from renewable and nuclear resources and will help to cater local requirements with minimum distribution and storage requirements.

The primary by-product of this process is oxygen. Steam-methane reforming process is also used widely for the hydrogen production. In this catalytic process, natural gas or other light hydrocarbons are reacted with steam to produce a mixture of hydrogen and carbon dioxide. The high-purity hydrogen is then separated from the product mixture. This method is the most energy-efficient commercialized technology currently available, and is most cost effective when applied to large, constant loads. Partial oxidation of fossil fuels in large gasifiers is another method of thermal hydrogen production. It involves the reaction of a fuel with a limited supply of oxygen to produce a hydrogen mixture, which is then purified. Partial oxidation can be applied to a wide range of hydrocarbon feedstock, including natural gas, heavy oils, solid biomass, and coal. Its primary by-product is carbon dioxide. Emerging methods hold the promise of producing hydrogen without carbon dioxide emissions, but all of these are still in early development phases. Some of these technologies are thermo-chemical water-splitting using nuclear and solar heat, photolytic (solar) processes using solid state techniques (photo-electrochemical, electrolysis), fossil fuel hydrogen production with carbon sequestration, and biological techniques (algae and bacteria).

SUMMARY OF THE INVENTION

An object of this invention is to propose a novel method of producing hydrogen gas from water.

Another object of this invention is to propose a novel method of producing hydrogen gas from water in presence of carbonaceous waste material and catalytic fluxes.

Further object of this invention is to propose a novel method of producing hydrogen gas from water wherein molten slag is used for the thermo-chemical decomposition of water.

Still further object of this invention is to propose a novel method of producing hydrogen gas from water which is simple and cost effective.

According to this invention there is provided a novel method for producing hydrogen gas from water comprising adding water to the slag and carbonaceous flux to produce hydrogen by thermo-chemical decomposition of water.

BRIEF DESCRIPTION OF THE DRAWINGS

The invention is explained in greater details with the accompanying drawings.

DETAILED DESCRIPTION OF THE INVENTION

A novel method is developed for production of hydrogen gas by water and slag reactions in the presence of carbonaceous waste materials and catalytic fluxes. The overall reaction of hydrogen gas formation is:

$$\langle A\rangle H_2O + xC + 2y\,FeO \xrightarrow{T} \langle x+y+z\rangle H_2 + \langle x-z\rangle CO + zCO_2 + yFe_2O_3 + \langle A-x-y-z\rangle H_2O$$

Where A is amount of water added in the system, x is amount of C available in the flux, y is FeO in the slag and z formation of $CO_2$ by reaction between CO and water. In this novel process, slag not only provides sensible heat for endothermic water decomposition reaction but also arrests the reverse reactions between hydrogen and oxygen gas. The Fe and lower oxides of Fe in the slag react with oxygen gas in the product gas mix and form $Fe_2O_3$ and thereby reduce the thermodynamic activity of oxygen. Different types of wastes, which can act as a deoxidizer, can be used as a flux to improve the production of hydrogen gas.

Thermal Decomposition of Pure Water in Presence of Slag:

The sensible heat of molten slag can be used for the thermo-chemical decomposition of water. In this process slag acts as heat sources and some of the deoxidizing constituents (Fe, FeO) in the slag also take part in the decomposition reaction (1) by reacting with nascent oxygen via reaction (2):

$$H_2O \xrightarrow{T} H_2 + \tfrac{1}{2}O_2 \quad \Delta H_{1873K} = 362 \text{ kJ/mole of water} \tag{1}$$

$$2FeO + \tfrac{1}{2}O_2 \xrightarrow{T} Fe_2O_3 \quad \Delta H_{1873K} = -175 \text{ kJ/mole of FeO} \tag{2}$$

Figure 1A:
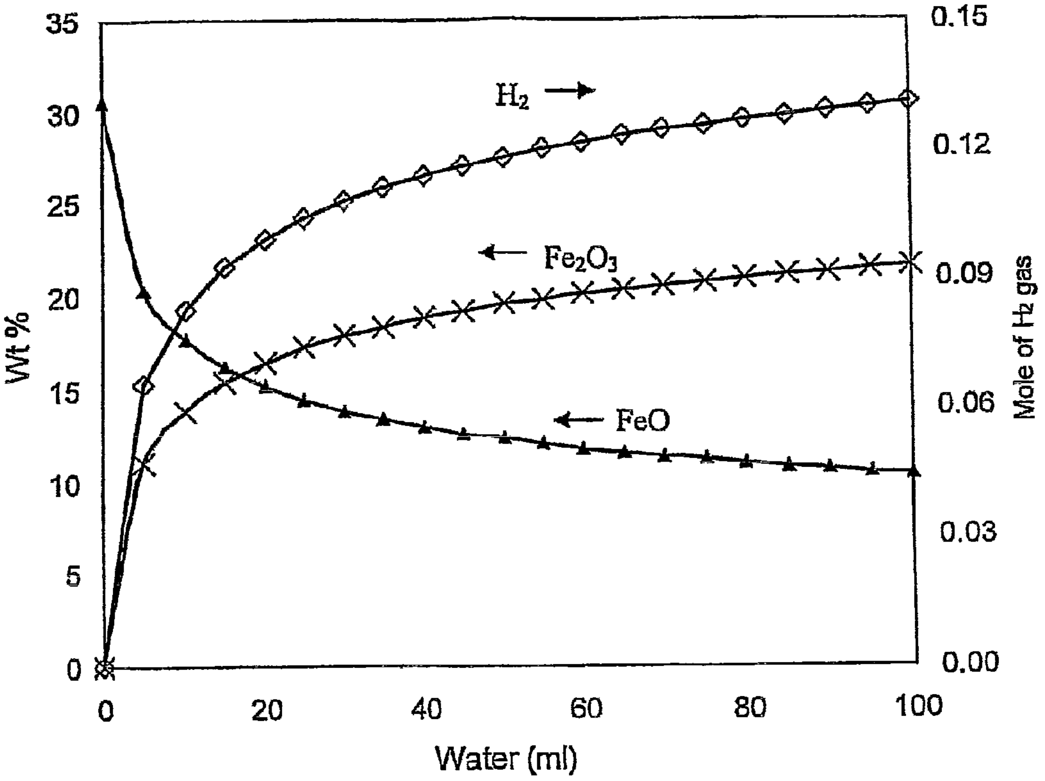
FIG. 1*a* shows the Effect of water addition on the concentration of FeO and $Fe_2O_3$ in the slag and formation of $H_2$ gas, based on results of computation of Water-Slag phase equilibria at 1873 K.
Figure 1B:
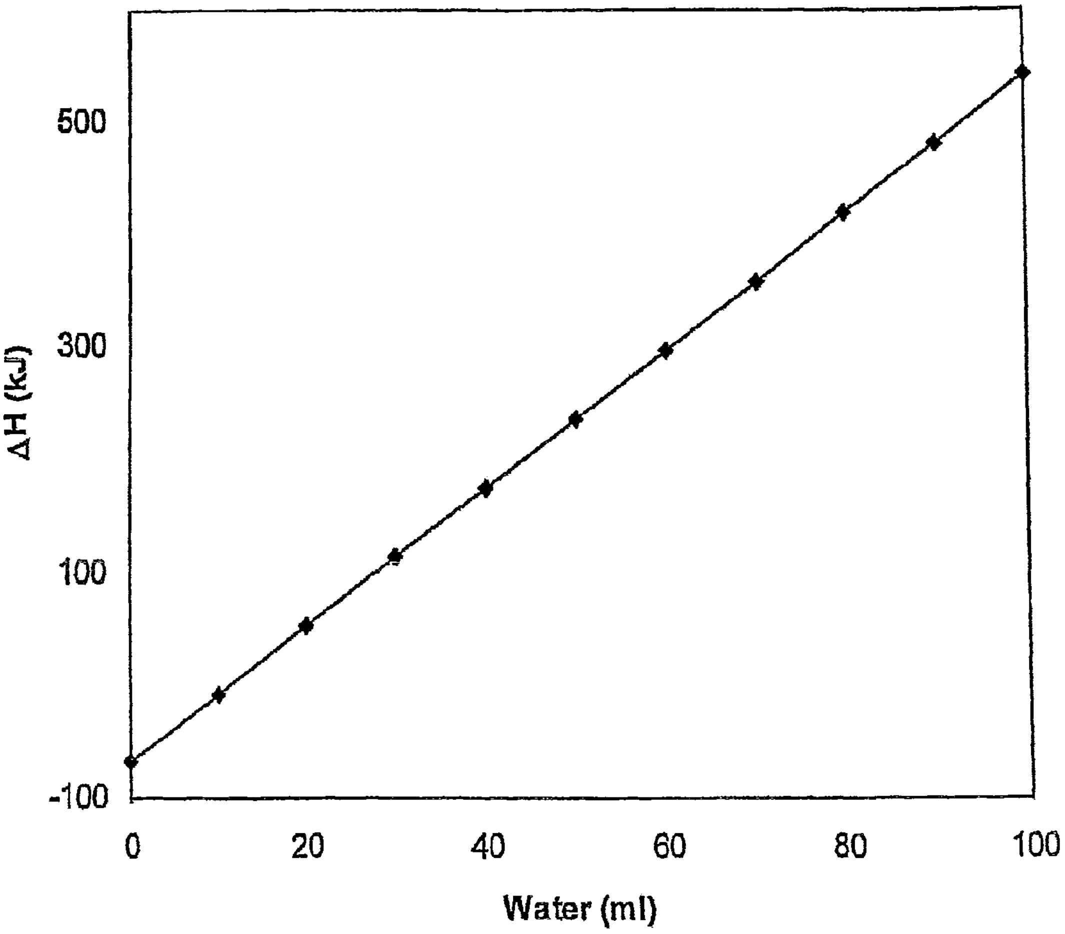
FIG. 1*b* relates to a plot of enthalpy of water-slag system verses water addition, based on results of computation of Water-Slag phase equilibria at 1873 K. (b).

The exothermic oxidation reaction provides additional energy required for reaction (1) and also reduces the oxygen partial pressure of the system and thereby enhances the rate of formation of hydrogen gas. The phase equilibria data was computed for reaction between 100 g LD slag with water at 1600 C. The amount of water varied from 0 to 100 ml to study the effect of water to slag ratio on hydrogen gas generation. The results of computation are presented in FIGS. 1*a* and *b*. The FIG. 1*a* shows effect of water addition on the formation of hydrogen gas and changes in the concentration of FeO and $Fe_2O_3$ in the slag. The enthalpy of the system at different water addition is shown in FIG. 1*b*, which shows that enthalpy of 100 gm slag can support reaction with up to 11.3 ml of water, any further addition of water will need additional energy input. Therefore theoretically reaction of 1 kg slag and 113 ml water will form 0.8 moles, i.e., 19.2 liters of hydrogen gas without any energy input at 1873 K temperature.

Thermal Decomposition of Pure Water in Presence of Slag and Carbonaceous Flux:

The carbonaceous and other plant wastes materials such as coal fines, coke breeze, etc. can be used as deoxidizer which will enhance formation of hydrogen by thermo-chemical decomposition of water. The reactions between water and carbon are:

$$H_2O + C \xrightarrow{T} H_2 + CO \quad \Delta H_{1873\,K} = 133 \text{ kJ/mole of } H_2O \tag{3}$$

$$H_2O + CO \xrightarrow{T} H_2 + CO_2 \quad \Delta H_{1873\,K} = -27 \text{ kJ/mole of } H_2O \tag{4}$$

Figure 2:
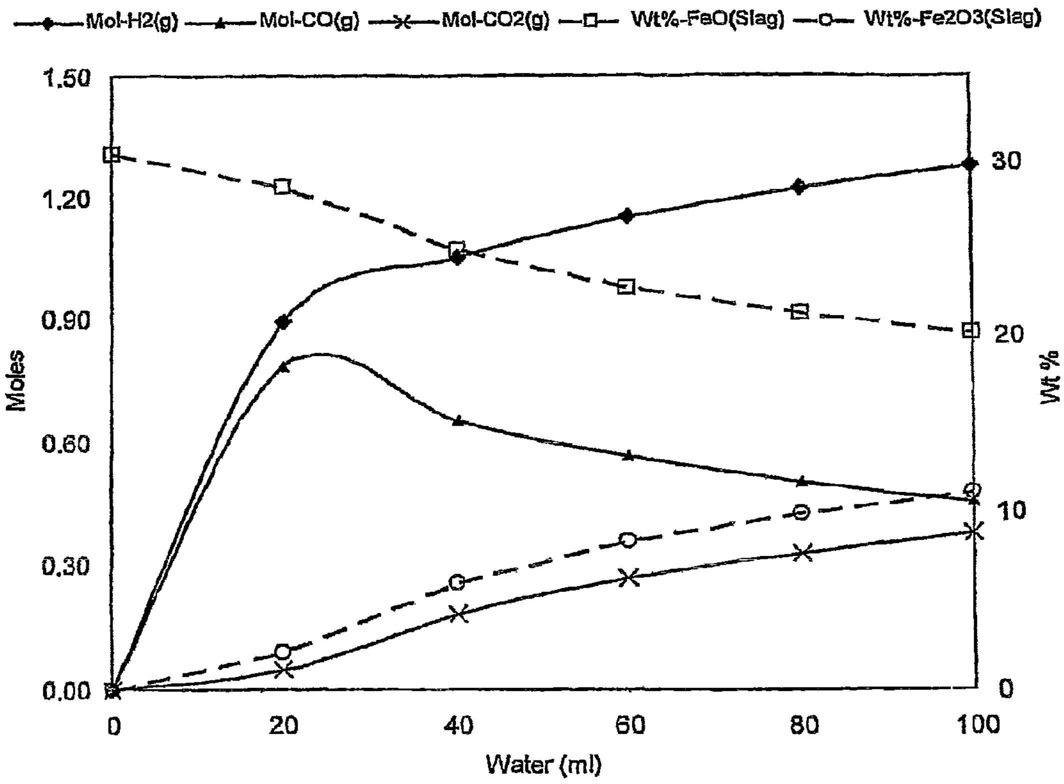
FIG. 2 shows the effect of water addition on the concentration of FeO and $Fe_2O_3$ in the slag and formation of $H_2$, CO and $CO_2$ gases computed using FACT-sage programme.

Phase equilibrium data of 100 gm slag and <A> ml water and 10 gm carbon was computed for 1873 K temperature and results of computation are shown in FIG. 2. The results computation revealed that the addition of excess water than stoichiometric requirement for carbon reaction enhances the production of hydrogen gas. The excess water reacts with CO gas in the system at high temperature and form $CO_2$ gas. If $\langle A\rangle$=5.55 mole (100 ml) and x=0.20 mole then energy required for formation of 1.20 moles of $H_2$, 0.46 moles of CO and 0.37 moles of $CO_2$ at 1873 K is $\Delta H_{1873\ K}$=740 kJ. Enthalpy of 1 kg slag at 1900 K==$\Delta H_{1900\ K}$=−2120 kJ. Theoretically, reaction of 100 ml water and 10 gm carbon will generate 1.20 moles, i.e., 26.9 ltrs of hydrogen gas at 1600 C and using sensible heat of 350 gm slag. ($H_2O$:C ratio=10:1). Therefore, theoretically reactions between 1 kg of slag can produce ~70 ltrs of the gas. Considering the lower efficiencies of formation reaction and heat transfer processes and other kinetic limitations, practically process can generate ~10 liters of hydrogen gas per kg of slag.

The innovative devices (laboratory and plant) have been designed and fabricated for production of hydrogen gas using the steel plant slag as a heat source. The device designed can effectively harvest the product gas with >35% hydrogen using waste heat from slag.

Figure 3:
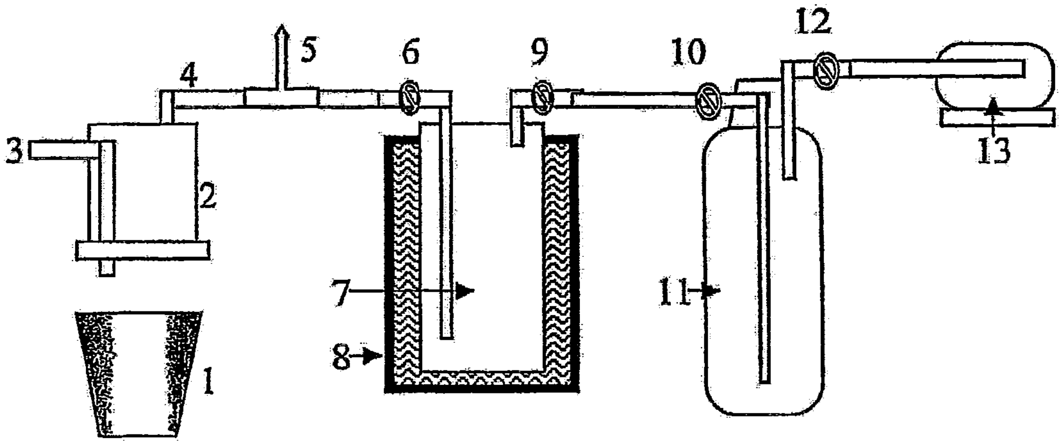
FIG. 3 shows the experimental set-up for hydrogen production.

The experimental set-up designed to study the reactions of molten slag and water is shown in FIG. 3. Standard procedure (step-by-step) followed during conducting experiments using set-up, shown in FIG. 3, is described below:

Before starting the experiments, the condenser (7) and gas collection (11) tanks were first evacuated using vacuum pump (13), for removal of residual air and generation of negative pressure for flow of gas in the tanks. The system was isolated from surrounding by closing valves (6, 12) before experiment. The granulated slag from LD steel plant was melted in the induction furnace and superheated to ~1650-1700 C. The molten slag was poured in the pre-heated graphite crucible (1). The reaction hood (2) was then kept on the crucible. The controlled amount of water was sprayed on molten slag surface through water line (3). The product gases were formed by reactions between water, deoxidizers in the slag, and carbon from the crucible, as discussed in above sections. The product gas of the reactions was collected from the hood (2) via steel tube (4) connected to the tank. During experiment, the product gas samples were collected from the sample port (5) for chemical analysis. The product gas was passed through condenser tank (7) by opening gas valve (6). The condenser tank (7) was cooled by water stored in the outer tank (8). The products gas after removal/stripping of the steam was then collected in the gas collection tank (11) by opening the gas flow control valves (9, 10). The gas samples from condenser tank and gas collection tank were collected by connecting the gas sampler to the valves (9) and (12) respectively. The condensed water from the condenser tank (7) was removed by opening the valve (14) connected at the bottom of the condenser tank (7).

Typical analysis of the gas samples collected from sample port (5), condenser tank (7) and collection tank (11) is given below:

(Concentration in Vol %)

| | Sample | | | | | | |
|---|---|---|---|---|---|---|---|
| Constituents | $H_2$ | CO | $CO_2$ | $O_2$ | $CH_4$ | $C_mH_n$ | $N_2$ |
| Port [5] | 22.8 | 11.2 | 7.0 | 3.0 | 6.2 | 0.6 | 33.4 |
| Condenser tank [7] | 23.0 | 1.6 | 1.2 | 1.2 | 2.0 | 1.0 | 70.0 |
| Collection tank [11] | 20.0 | 1.8 | Nil | 2.0 | 4.0 | 1.2 | 71.0 |

Figure 4:
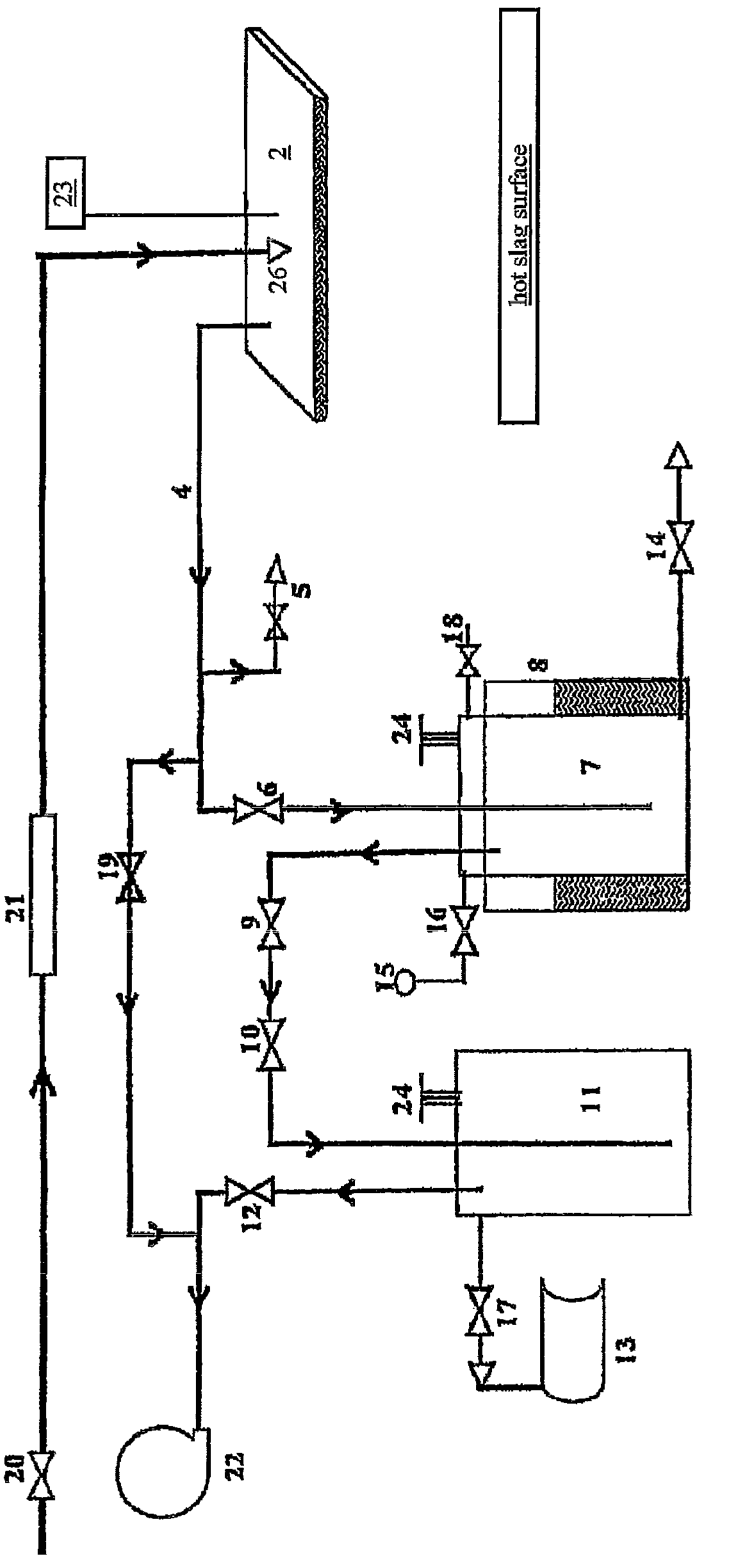
FIG. 4 shows a schematic of the set-up for hydrogen production in the slag pit at plant level.

Set-Up for Plant Tests:

The set-up designed and fabricated for conducting trials in the slag pit at LD#2 steel plant is shown in FIG. 4. Standard procedure (step-by-step) followed is described below:

The experiments were carried out in slag pit in steel making unit, LD#2. The slag dumping procedure of the LD#2 steel pot is briefly described. In the plant slag from the converter vessel (batch wise) is collected in the slag pot of ~25 tonne capacity. The slag pot is then transferred to the slag dumping area by slag trolley. After arrival of the slag pot trolley in slag pit area, the pot is removed from the trolley by overhead crane and slag is then poured in the slag pit. It takes about 2 days to fill the slag pit. Once pit is completely filled with slag, slag is cooled for some time and then it is quenched by spraying water jets from sides and top. It takes about a day to cool the slag in the pit. During cooling of slag, large volume of steam is released in air. After cooling the slag is removed from the pit by dumper and is transported to slag processing area. The trials were carried out in the pit which was almost full.

Before starting experiment, the entire set-up including gas collection tank (11) and condenser tank (7) were evacuated using vacuum pump (13). The pressure in the tank was monitored using the compound gauge (15) attached to condenser tank (7). Once compound gauge registered −500 mm reading, the set-up, i.e., tanks were isolated by closing valves (6, 12, 17 and 18). After slag was poured in the pit by crane, the experimental set-up, as shown in FIG. 3, mounted on the trolley (24) was moved close to slag pit by using tractor. When trolley with set-up reached to the marked area, first the flux containing carbonaceous material was sprayed on the molten slag surface by using polythene container bags, then the reaction hood (2) was lowered using chain-pulley block system (23) and placed on the hot slag surface. For positive isolation from surrounding atmosphere, high temperature ceramic fibre wool (25) was fixed on the edge of reaction hood (2). After placing of the hood (2) on the slag surface, the water inlet valve (20) was opened and water flow was monitored through flow indicator (21) connected to the water inlet line. The water was then sprayed uniformly on the surface of the molten slag by water nozzle (26). The product gases were formed by reactions between water-slag-flux as described earlier. Immediately after opening the water inlet valve (20), the gas blower (22) was switched ON and valve (19) was opened to remove the air and steam from the gas pipe line, once product gas with steam started coming out from the exhaust pipe of the blower (22), the valve (19) was closed and valve (6) was opened slowly. The product gas samples were collected by opening valve (5) and by connecting gas sampler. When gas pressure in the tank reached +800 mm according to compound gauge (15) the gas valve (6) was closed and gas valve (19) was opened. After that the reaction hood (2) was moved up samples were collected from condenser (7) and collection (11) tanks using samples ports connected to valves (17 and 18). After sample collection the set-up was evacuated as described before for next experiment. Explosive diaphragms were provided on both collection and condenser tanks to protect the system from any explosion as product gas contained >30% hydrogen and <10% CO gases which are explosive and inflammable.

Typical analysis of the gas samples collected from sample port (5) is given below:

| | Sample | | | | | | |
|---|---|---|---|---|---|---|---|
| Constituents | $H_2$ | CO | $CO_2$ | $O_2$ | $CH_4$ | $C_mH_n$ | $N_2$ |
| Expt/Slag5/04/01 | 40.6 | 4.8 | 1.0 | 9.6 | — | — | Bal |
| Expt/Slag6/30/01 | 36.6 | 7.4 | 3.0 | 3.4 | — | — | Bal |

We claim:

1. A system for the production of a gas stream comprising hydrogen, the gas stream containing greater than 30% hydrogen by volume with less than 10% carbon monoxide by volume when adding water and carbonaceous flux, such that an $H_2O$:C ratio by weight is 10:1, to molten slag containing FeO, the system comprising:

a graphite crucible or slag pit;

FeO-containing molten slag in the graphite crucible or slag pit, wherein FeO is a deoxidizing constituent for reacting with oxygen to form $Fe_2O_3$ for preventing a reverse reaction between hydrogen and oxygen gas;

a reaction hood disposed over said crucible or slag pit, wherein the reaction hood isolates a reaction space under the reaction hood from the surrounding atmosphere;

a water line for spraying water on the FeO-containing molten slag in the crucible or slag pit to produce hydrogen gas by the decomposition of water; and a tube for collecting and transferring a gas stream containing greater than 30% hydrogen by volume with less than 10% carbon monoxide by volume from said hood into a condenser tank;

wherein the collected hydrogen gas is passed to a gas collection tank via at least one control valve.

2. The system of claim 1, comprising a first valve between the reaction hood and the condenser tank for selectively isolating the condenser tank from the reaction hood.

3. The system of claim 1, comprising a second valve between the condenser tank and the gas collection tank for selectively allowing gas to collect in the gas collecting tank after removal of steam in the condenser.

4. The system of claim 1, wherein the molten slag acts as a heat source, wherein the deoxidizing constituent FeO in the molten slag reacts with nascent oxygen produced by the decomposition of water, and wherein the system further comprises a gas blower that is used to evacuate air from the reaction hood, the condenser tank, the steel tube and the gas collection tank before commencing the production of the gas stream comprising of hydrogen and carbon monoxide in the reaction hood.

5. The system of claim 4, wherein the oxidation of FeO in molten slag with nascent oxygen, which is an exothermic reaction, provides additional energy for the decomposition of water, which is an endothermic reaction, and reduces oxygen partial pressure of the system to enhance the rate of formation of hydrogen gas.

6. The system as claimed in claim 4, further comprising a vacuum pump for generating a negative pressure in the condenser tank and the gas collecting tank.

7. The system as claimed in claim 6, comprising a second valve between the gas collecting tank and the vacuum pump for selectively allowing residual air to be removed from the tanks by the vacuum pump.

8. A system for the production of a gas stream comprising hydrogen, the system comprising:

a crucible or slag pit;

FeO-containing molten slag in the crucible or slag pit, wherein FeO is a deoxidizing constituent for reacting with oxygen to form $Fe_2O_3$ for preventing a reverse reaction between hydrogen and oxygen gas;

a reaction hood disposed over said crucible or slag pit, wherein the reaction hood isolates a reaction space under the reaction hood from oxygen in the surrounding atmosphere for preventing a reverse reaction between hydrogen and oxygen gas;

a water line for spraying water on the FeO-containing molten slag in the crucible or slag pit to produce hydrogen gas by the decomposition of water; and a tube for transferring a gas stream containing hydrogen from said reaction hood.

* * * * *